United States Patent [19]

Westerkamp

[11] Patent Number: 5,198,249
[45] Date of Patent: Mar. 30, 1993

[54] MOLD CLAMPING SYSTEM

[75] Inventor: Jerry Westerkamp, Cincinnati, Ohio

[73] Assignee: Cincinnati Milacron Inc., Cincinnati, Ohio

[21] Appl. No.: 679,209

[22] Filed: Apr. 1, 1991

[51] Int. Cl.$^5$ .............................................. B29C 45/64
[52] U.S. Cl. .................................... 425/589; 384/909; 425/450.1
[58] Field of Search ............... 425/589, 590, 592, 593, 425/595, 450.1, 451.5, 451.6, 451.9; 384/908, 909

[56] References Cited

U.S. PATENT DOCUMENTS

| | | | |
|---|---|---|---|
| 3,921,225 | 11/1975 | Suska | 16/273 |
| 3,929,347 | 12/1975 | Masser | 267/52 |
| 4,066,246 | 1/1978 | Korstvedt | 285/40 |
| 4,111,115 | 9/1978 | Cory | 100/116 |
| 4,363,580 | 12/1982 | Bell | 411/501 |
| 4,370,869 | 2/1983 | Jonassen | 464/156 |
| 4,393,792 | 7/1983 | St. Clair | 112/2.1 |
| 4,586,865 | 5/1986 | Hansen | 414/528 |
| 4,737,093 | 4/1988 | Hori et al. | 425/450.1 |
| 5,002,164 | 3/1991 | Bowyer | 188/153 D |

Primary Examiner—Jay H. Woo
Assistant Examiner—James P. Mackey
Attorney, Agent, or Firm—Nies, Kurz, Bergert & Tamburro

[57] ABSTRACT

An injection molding machine clamping system in which a stepped bar is provided between the movable and stationary platens, and blocking apparatus is carried by one of the platens to block movement of the stepped bar upon the happening of certain conditions. The stepped bar is slidably carried in a bushing in the other mold platen, the bushing preferably being made from an ultra-high molecular weight polyethylene material to reduce wear, to eliminate the need for lubricants, and also to reduce the intermittent clicking noise that results when the notched bar is moved axially through a bore.

3 Claims, 5 Drawing Sheets

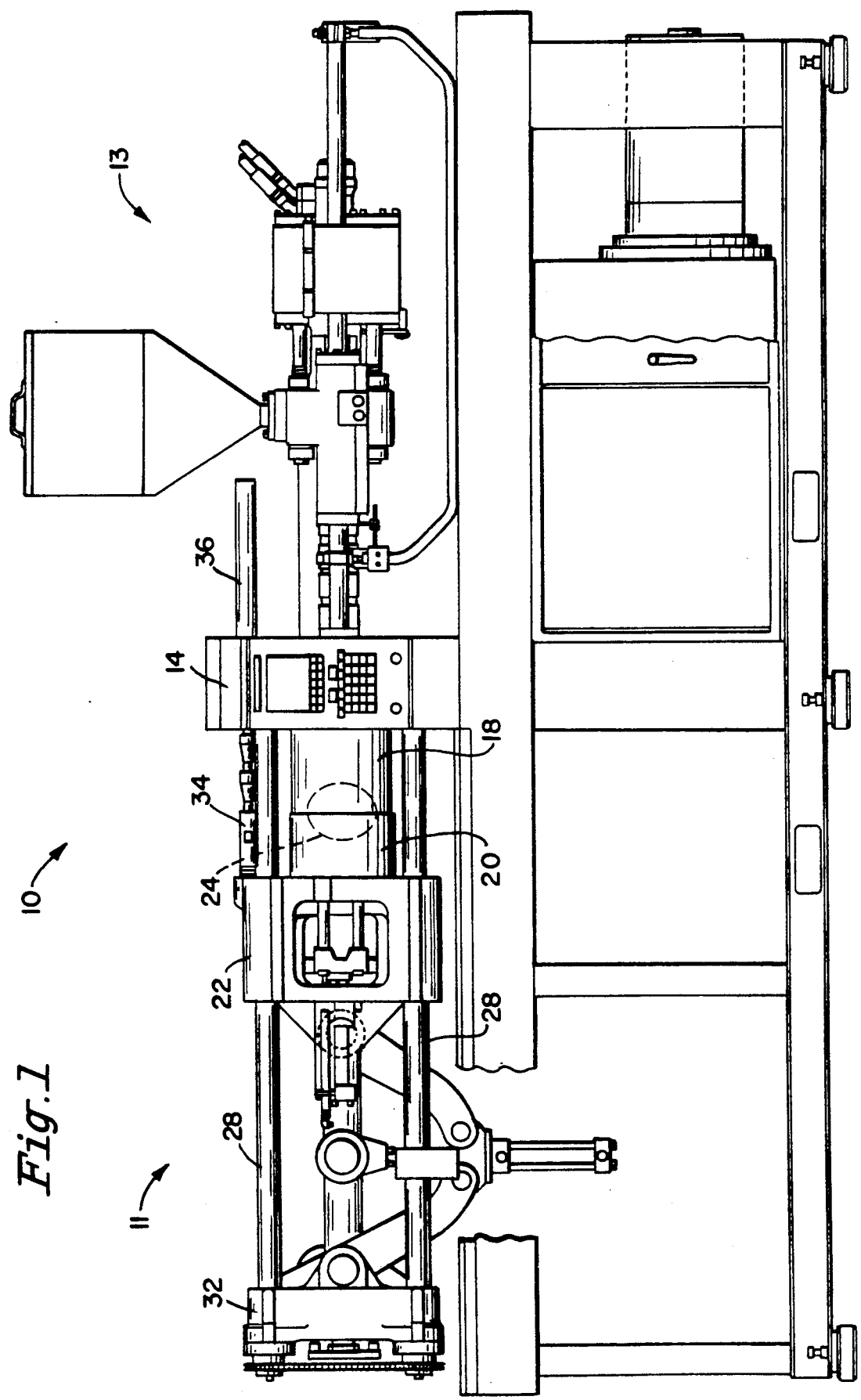

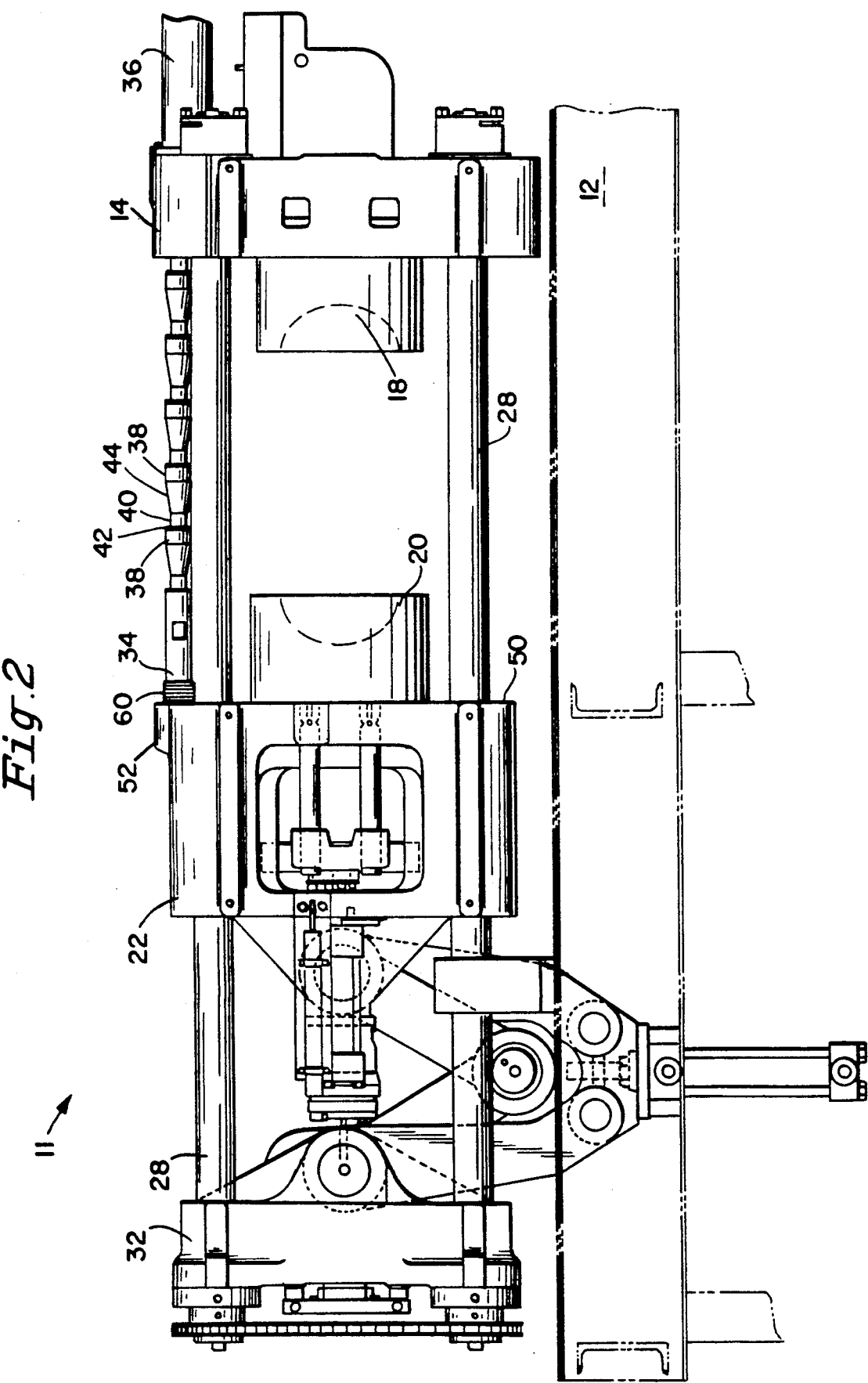

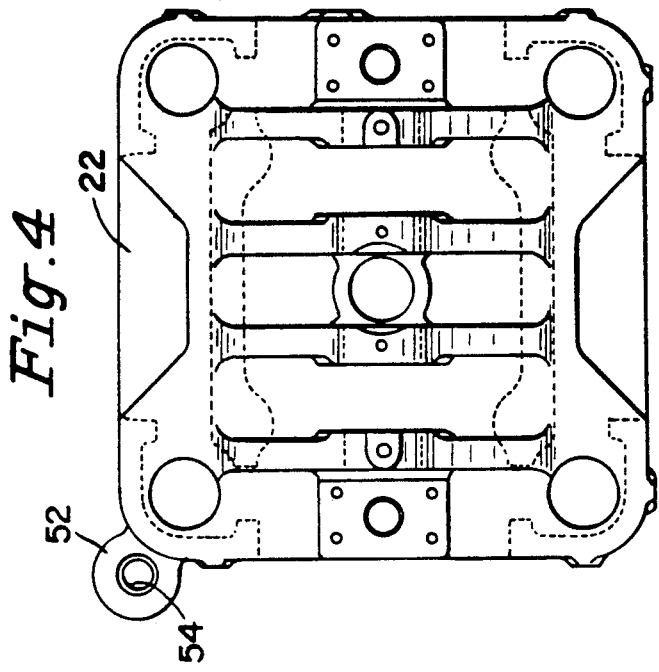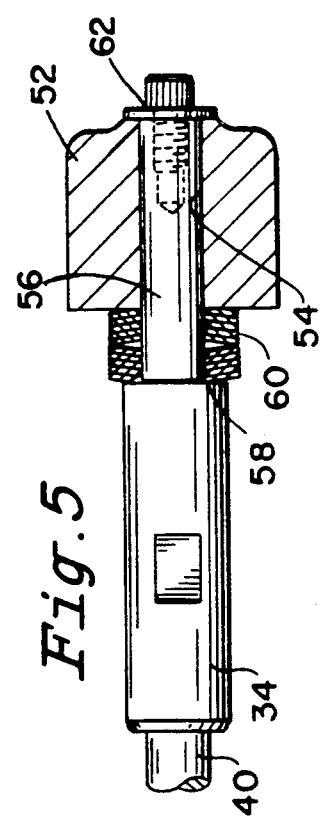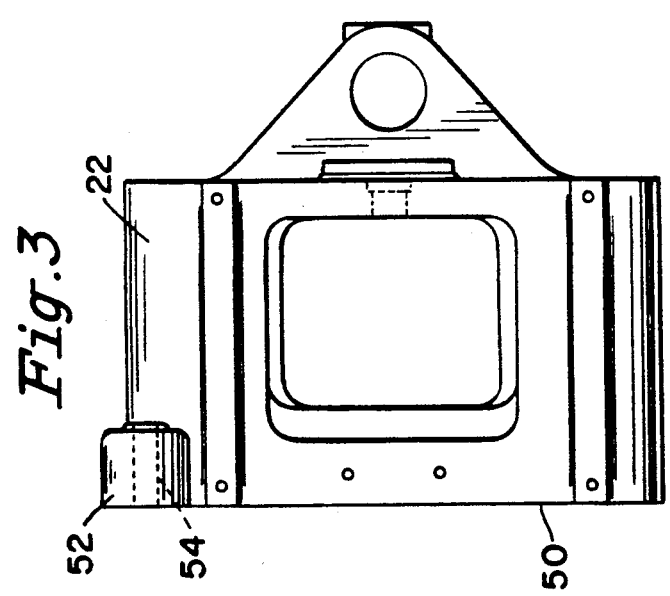

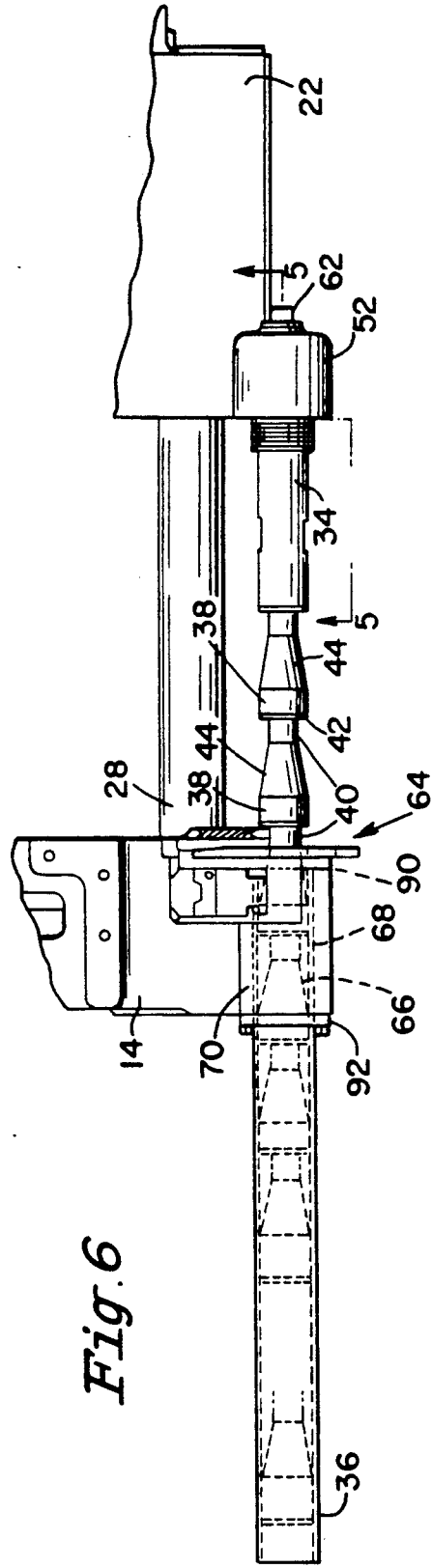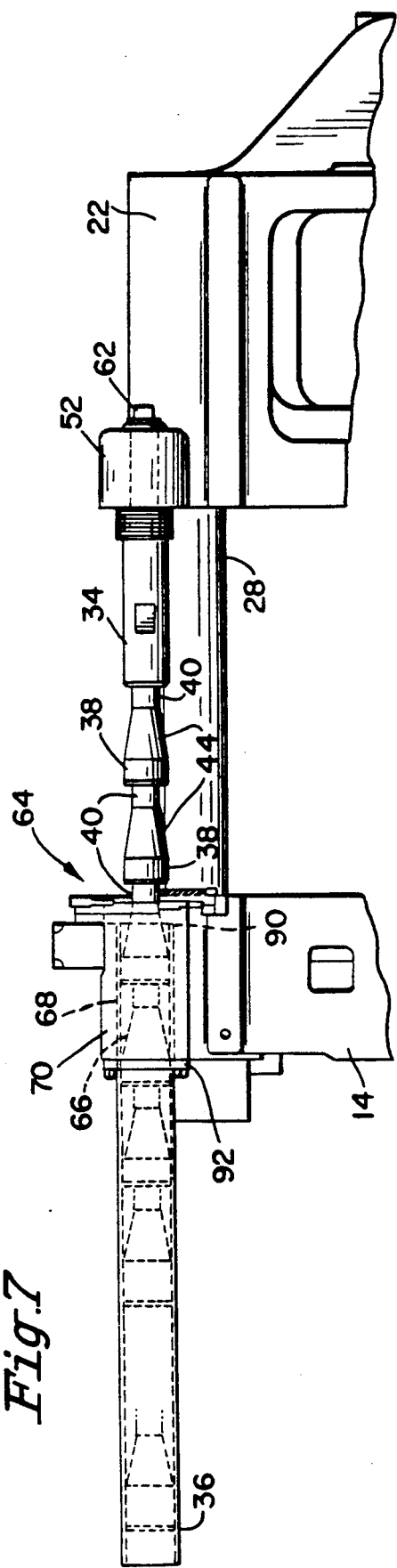
Fig.6
Fig.7

MOLD CLAMPING SYSTEM

BACKGROUND OF THE INVENTION

1. Field of the Invention

The present invention relates to apparatus to minimize noise and wear in blocking apparatus provided in a mold clamping system to prevent unintended movement of a first mold-carrying platen toward a second mold-carrying platen. More particularly, the present invention relates to the reduction of noise and wear in apparatus in which a blocking bar having a stepped outer surface is slidably carried in a platen bore by providing a non-metallic supporting bushing in the bore to eliminate wear between the blocking bar and the bar-receiving bore in the platen, and simultaneously to reduce the intermittent contact noise that results as the stepped bar passes through the bore.

2. Description of the Related Art

Machines such as presses, die casting machines, injection molding machines, and the like, generally include a movable platen that is supported for movement toward and away from a fixed platen to selectively bring molds or other shaping members carried by the respective platens into and out of engagement or contact. Many different approaches have been suggested to prevent unintended relative movement of the platens toward each other when a particular condition has been detected.

A common approach to preventing unintended movement of one machine part relative to another, such as a movable platen, is a limit switch or another form of position sensor that is adapted to sense the position of one of the parts and to disable the machine when the part has reached a predetermined position, or when a predetermined condition has occurred.

Another approach is to provide a notched or stepped bar that extends between the two parts to be maintained in spaced condition, such as mold-carrying platens, and to provide a rigid but movable blocking member that is adapted to be received in the notch or step formed in the bar, to thereby block movement of the platens toward each other when a predetermined condition occurs. In such an arrangement, it is necessary that the stepped bar be securely carried by one of the mold-carrying platens, and that the other mold-carrying platen have a bore to slidably receive the stepped bar and to maintain it in a properly aligned condition so that the blocking member can engage with one of the steps or notches and thereby prevent unintended relative movement of the platens.

In previously-employed stepped bar structures the metal-to-metal contact that is involved in such a construction results in metallic dust that constitutes a contaminant. Further, the introduction of a lubricant between the bar and bore to minimize friction and the generation of metallic dust is also undesirable because it also is a contaminant, especially in situations where sterile articles are being injection molded for medical purposes.

Finally, the notched structure of the stepped bar causes an objectionable staccato clicking sound as the bar passes through and within the bore.

It is an object of the present invention to overcome the above-described deficiencies in the presently-employed arrangements.

It is another object of the present invention to provide an arrangement in which a bushing is provided to slidably receive a notched bar and that does not require lubrication by foreign substances.

It is a further object of the present invention to provide a bushing for slidably receiving a stepped bar and that does not result in the generation of metallic dust.

It is a still further object of the present invention to provide a bushing for slidably receiving a stepped bar and that does not substantially transmit the intermittent sounds that result when the notched stepped bar is slidably moved through the metallic bore.

SUMMARY OF THE INVENTION

Briefly stated, in accordance with one aspect of the present invention, an improved bushing is provided for use in a press that includes a movable, mold supporting platen, and a stationary, mold-supporting platen, one of the platens supporting a stepped bar and the other platen supporting blocking apparatus engageable with the stepped bar for preventing axial movement of the stepped bar and associated platen. A non-metallic bushing is provided, the bushing including a bore through which the stepped bar is adapted to slidably pass. The bore has a size and cross section corresponding substantially with the size and cross section of the stepped bar.

BRIEF DESCRIPTION OF THE DRAWINGS

FIG. 1 is a side elevational view of an injection molding machine including stepped bar apparatus in accordance with the present invention, and showing a single-toggle-type mold actuating and clamping mechanism in its fully extended position with the mold portions in contact with each other.

FIG. 2 is an enlarged side elevational view of the mold clamping system for the molding machine of FIG. 1 showing the single toggle platen actuating mechanism and the movable platen in their fully retracted positions relative to a fixed, mold-carrying platen.

FIG. 3 is a side elevational view of the movable platen of the machine shown in FIGS. 1 and 2.

FIG. 4 is a rear elevational view of the movable platen shown in FIG. 3.

FIG. 5 is an enlarged, fragmentary view, partially in section, of the connection of the stepped bar with the movable platen, taken along the line 5—5 of FIG. 6.

FIG. 6 is a fragmentary top view of a portion of the clamping system of the injection molding machine showing the stepped bar and associated blocking apparatus.

FIG. 7 is a fragmentary side view of the structure illustrated in FIG. 6.

DESCRIPTION OF THE PREFERRED EMBODIMENTS

Figure 9:
FIG. 9 is a side view of a stepped bar bushing in accordance with the present invention.

Referring now to the drawings, and particularly to FIG. 1 thereof, there is shown an injection molding machine 10 that includes a base 12 that supports a plastication and injection system 13 for plasticating a solid polymeric material into a flowable, viscous form and for injecting the plasticated material into a mold cavity 24 defined by a pair of cooperating mold portions 18, 20 that are movable relative to each other to selectively open and close mold cavity 24.

Mold portion 20 is supported for movement toward and away from mold portion 18 by a mold traversing and clamping system 11 that includes a stationary platen 14 secured to base 12 to rigidly support mold portion 18. Mold portion 20 is secured to a movable platen 22 that is slidably carried on tie rods 28 that extend between stationary platen 14 and a die height platen 32, which is also carried on base 12. Mold traversing and clamping system 11 is a toggle-type system that is provided for traversing mold portion 20 toward and away from mold portion 18, and for securely holding together mold portions 18 and 20 while plasticated material is injected into mold cavity 24 under high pressure.

A stepped bar 34 is connected to and carried by movable platen 22 to extend longitudinally toward and to pass through stationary platen 14. A tubular housing 36 is provided on stationary platen 14 to receive a part of stepped bar 34 when movable platen 22 is moved toward stationary platen 14. As will be explained in greater detail hereinafter, an engaging mechanism carried by stationary platen 14 engages with stepped bar 34 to prevent further movement of movable platen 22 toward stationary platen 14 when a predetermined condition occurs, such as when a sliding gate allowing access to the molds is in the open position.

Mold traversing and clamping system 11 is shown in enlarged detail in FIG. 2 with mold portions 18 and 20 separated from each other and with a greater length of stepped bar 34 withdrawn from tubular housing 36.

Stepped bar 34 is of a generally cylindrical structure that includes a plurality of axially spaced first cylindrical portions 38, and a plurality of adjacent second cylindrical portions 40 having a smaller diameter than that of first cylindrical portions 38. One end of each of second cylindrical portions 40 abuts an end of the adjoining first cylindrical portion to define an annular shoulder 42, and the flat, transverse surfaces of each of shoulders 42 faces toward stationary platen 14. Frustoconical transition sections 44 extend between successive pairs of first and second cylindrical portions.

Referring to FIGS. 3 and 4, movable platen 22 is a generally rectangular structure and has a planar front face 50 to which mold portion 20 is bolted. At one corner of movable platen 22 a boss 52 is provided having a throughbore 54 to receive one end of stepped bar 34, which is secured to movable platen 22 so that stepped bar 34 moves together with movable platen 22.

Referring now to FIG. 5, the end of stepped bar 34 that is received in boss 52 of movable platen 22 is shown in enlarged detail. Bar 34 has a reduced diameter end portion 56 that is snugly received in bore 54 so that bar 34 has a minimum of lateral play relative to bore 54. End portion 56 defines with the body of stepped bar 34 a shoulder 58, and a plurality of belleville springs 60 are provided to serve as a shock absorber and to prevent the instantaneous application of impact loads to boss 52. Stepped bar 34 is secured against movement in an opposite direction, out of boss 52 by a bolt and washer arrangement 62.

Stepped bar 34 is supported in stationary platen 14 in the manner shown in FIGS. 6 and 7, which also show the associated blocking apparatus 64. Stepped bar 34 is slidably received in a tubular bushing 66 that is retained in a bore 68 provided in a tubular housing 70 secured to stationary platen 14. Tubular housing 36, into and out of which stepped bar 34 is movable, extends from the rear face of stationary platen 14 and has a length sufficient to fully accommodate the extended length of stepped bar 34 when movable platen 22 is at its closest position relative to stationary platen 14.

Figure 8:
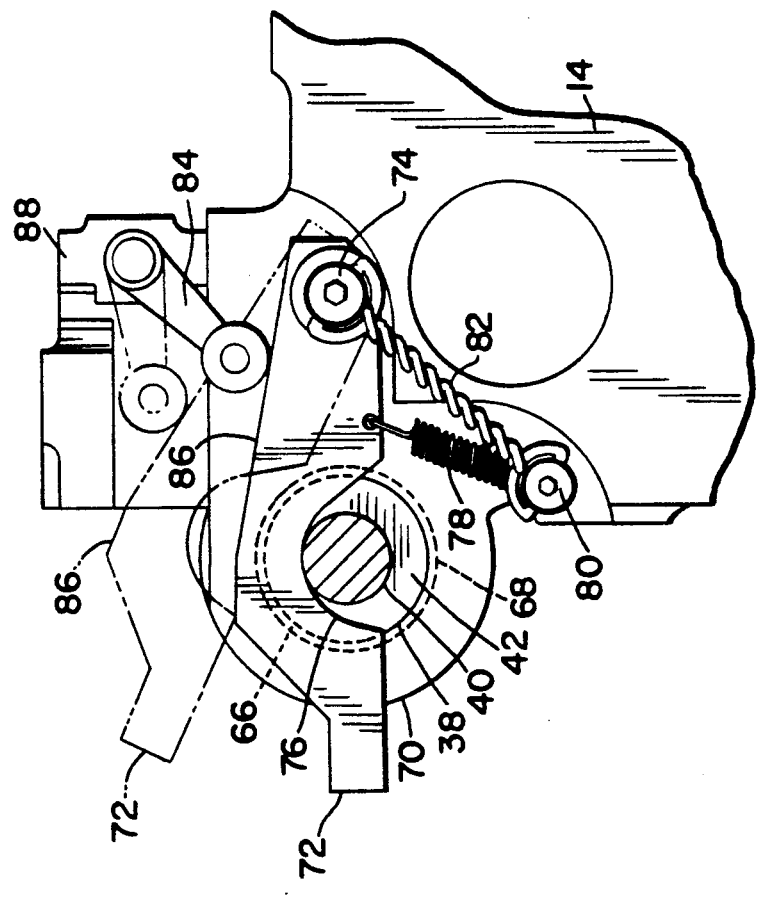
FIG. 8 is an enlarged, fragmentary end view, partially in section, showing the blocking apparatus in position relative to the stepped bar.

Blocking apparatus 64 is carried by movable platen 22 and includes blocking structure that is received in and cooperates with the gaps defined by reduced diameter second sections 40 in stepped bar 34 as shown in FIGS. 6, 7, and 8. As best seen in FIG. 8, pivotable locking gate 72 pivots about a fixed axis defined by a pivot pin 74 carried by stationary platen 14. Locking gate 72 is in the form of a plate that includes an arcuate section 76 adapted to be in surface contact with the surface of one of second cylindrical portions 40 of stepped bar 34. Locking gate 72 has a vertical and horizontal extent such that when it is in the position shown in full lines in FIG. 8, in which arcuate section 76 is in surface contact with a portion 40 of stepped bar 34, a face of locking gate 72 abuts one of shoulders 42. Preferably the size of locking gate 72, including the radius of curvature of arcuate section 76, is such that there is a relatively large surface contact area between the face of locking gate 72 and one of shoulders 42 of stepped bar 34. The contact area is defined by a crescent-shaped area subtended by the intersection of a projection of the outer diameter of a cylindrical portion 38 and a projection of arcuate portion 76, as best seen in FIG. 8.

As also shown in FIG. 8, locking gate 72 is spring biased toward stepped bar 34 by means of a tension coil spring 78 that extends between locking gate 72 and a stationary pin 80 secured to stationary platen 14. Pin 80 and pivot pin 74 are prevented from vibrating loose by means of a lockwire 82 that extends between and is connected with the respective pins in a manner well known to those skilled in the art. Additionally, a position sensor in the form of a pivotable cam follower 84 is provided to ride on the upper surface 86 of locking gate 72. Cam follower 84 can be connected with a limit switch 88 secured to stationary platen 14 to sense whether locking gate 72 is in an upper, disengaged position as shown by dashed lines in FIG. 8, to permit axial movement of stepped bar 34, or whether locking gate 72 is in a lower, engaged position as shown by solid lines in FIG. 8, to block stepped bar 34 and thereby prevent movement of movable platen 22 toward stationary platen 14.

Referring once again to FIGS. 6 and 7, bushing 66 through which stepped bar 34 passes is retained in housing 70 by an inner radial step or land 90 at one end of bore 68 to limit movement in a rightward direction, as viewed in FIGS. 6 and 7, and an outer annular flange 92, which serves to prevent outward axial movement of bushing 66 in a leftward direction, as viewed in FIGS. 6 and 7.

In operation, when the sliding gate (not shown) positioned in front of the mold area of the molding machine is in the open position, tension spring 78 acts to draw locking bar 72 toward the stepped bar 34, so that it engages the bar at a reduced diameter section 40, thereby blocking movement of stepped bar 34 and effectively blocking motion of movable platen 22 in a direction toward stationary platen 14. (See FIG. 8)

The sliding gate in front of the mold area carries a cam (not shown) in the form of an inclined plane, which is in operative alignment with locking gate 72 to cause locking gate 72 to be raised and spaced from stepped bar 34 when the mold area sliding gate is closed. Thus, when the mold area sliding gate is closed the cam engages locking gate 72 and holds it in the raised position shown by the dashed lines in FIG. 8, thereby permitting movement of blocking bar 34 and movable platen 22, relative to stationary platen 14.

Bushing 66 is a tubular structure of sleeve-like form, as illustrated in FIG. 9, and is made from a polymeric material, preferably one that has a low coefficient of friction, to thereby eliminate the need for lubricants in the form of oils, greases, and the like. An especially preferred bushing material is a polyethylene material that is referred to as ultra high molecular weight (UHMW) polyethylene. One type of such material that has been found to be suitable for use in the present invention is available from Joseph T. Ryerson & Son, Inc. of Chicago, Ill., and which is identified as UHMW Polyethylene, Type 819. The UHMW material has been found to have a low coefficient of friction, ranging from about 0.10 to about 0.22 in contact with polished steel.

The preferred ultra-high molecular weight polymer has a molecular weight greater than about 3,000,000, and has an intrinsic viscosity greater than about 20. Additionally, the preferred ultra-high molecular weight polyethylene when provided in the form of a tubular bushing of the type shown in FIG. 9 eliminates the generation of metallic dust, to thereby reduce contamination in the molding environment, and it does not require the use of any friction-reducing lubricant compositions, thereby further reducing the likelihood of contamination of the molding environment. Furthermore, use of the preferred material also serves to eliminate the annoying, intermittent clicking noise that otherwise results when a stepped bar of the type illustrated in the drawings is moved through a bore. Thus, the preferred material surprisingly solves all of the problems that were encountered in the previously-employed arrangements.

The preferred material has also been found to be far superior to other polymers that were tested for use in such a bushing. such as nylon, phenolic, and DELRIN (an acetal polymer available from E. I. duPont deNemours & Co., Wilmington, Del.) The nylon material was found to be subject to damage by the stepped bar, the phenolic material resulted in excessive wear, and use of the DELRIN material caused scoring of the outer diameter of the stepped bar. Thus, the preferred material resulted in less noise, no scoring or abrasion of the stepped bar, and it was found to be essentially self-lubricating, it had sufficient abrasion resistance to provide long life, and it had sufficient toughness to withstand impact with steel without fracturing Although particular embodiments of the present invention have been illustrated and described, it will be apparent to those skilled in the art that various changes and modifications can be made without departing from the spirit of the present invention. It is therefore intended to encompass within the appended claims all such changes and modifications that fall within the scope of the present invention.

What is claimed is:

1. In an injection molding machine including a pair of mold-supporting platens adapted for relative movement toward and away from each other, one of the platens being a movable platen and securely supporting an elongated guide bar and the other platen being a stationary platen and having an opening for slidably receiving and supporting the guide bar and carrying a blocking apparatus engageable with the guide bar for preventing axial movement of the platens toward each other, the improvement comprising the guide bar including a plurality of axially spaced first cylindrical portions, second cylindrical portions positioned between successive pairs of first cylindrical portions, the second cylindrical portions having a smaller outer diameter than that of the first cylindrical portions to define at an end of each first cylindrical portion an annular shoulder to permit engagement with an annular shoulder of a radially inwardly movable blocking gate carried by the stationary platen to block movement of the guide bar and of the movable platen, a tubular bushing carried in the stationary platen, the bushing including a bore through which the guide bar is adapted to slidably pass when the blocking apparatus is disengaged and the platens are moved toward and away from each other, the bushing bore having a size and cross section corresponding substantially with the size and cross section of the first cylindrical portions of the guide bar. wherein the bushing is formed from ultra-high molecular weight polyethylene to eliminate the need for lubrication, to minimize noise as the stepped bar passes through the bushing bore, and to eliminate the generation of metallic dust based upon relative sliding movement of the guide bar and the bushing.

2. The injection molding machine in accordance with claim 1, wherein the molecular weight of the ultra-high molecular weight polyethylene is greater than about 3,000,000.

3. The injection molding machine in accordance with claim 2 wherein the intrinsic viscosity of the ultra-high molecular weight polyethylene is greater than about 20.

* * * * *